(No Model.)

P. A. MYERS.
PISTON PACKING FOR PUMPS.

No. 261,026. Patented July 11, 1882.

Attest:
Walter Donaldson
F. L. Middleton

Inventor
Philip A. Myers
by Ellis Spear
Atty

UNITED STATES PATENT OFFICE.

PHILIP A. MYERS, OF ASHLAND, OHIO, ASSIGNOR OF ONE-HALF TO FRANCIS E. MYERS, OF SAME PLACE.

PISTON-PACKING FOR PUMPS.

SPECIFICATION forming part of Letters Patent No. 261,026, dated July 11, 1882.

Application filed December 31, 1881. (No model.)

*To all whom it may concern:*

Be it known that I, PHILIP A. MYERS, of Ashland, in the county of Ashland and State of Ohio, have invented a new and useful Improvement in Piston-Packing for Pumps; and I do hereby declare that the following is a full, clear, and exact description of the same.

My invention is an improvement in the packing of pistons for pumps, and is more especially applicable to the upper piston when double pistons are used, being specially fitted to act with a device by means of which it may be readjusted when worn without removal from the cylinder.

Figure 1:
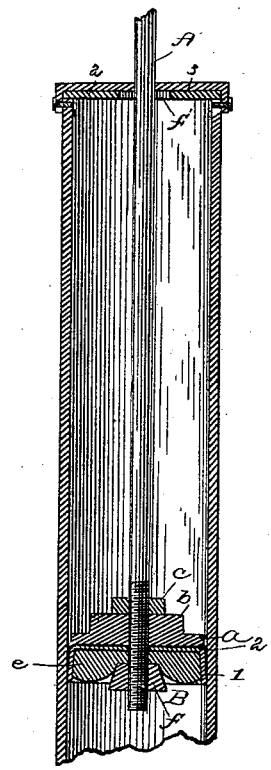
Figure 2:
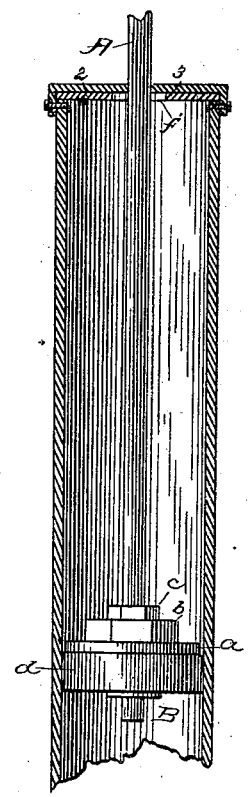
Figure 3:
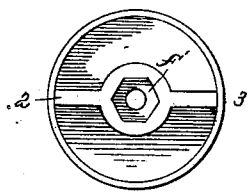

In the accompanying drawings, Figure 1 represents a central longitudinal section of my improvements applied to a piston and cylinder. Fig. 2 shows a side elevation of the same, and Fig. 3 represents a plan view of the under surface of the cylinder-head.

I have hereinafter described the invention as illustrated in the drawings, and have specifically claimed the parts deemed by me to be new.

In the drawings, A represents the piston-rod, and B the piston attached thereto. The piston consists of a disk, $a$, which may or may not be provided with the boss $b$, but is centrally perforated, so that it may be slipped upon the piston-rod A. It is held above by means of a nut, $c$, on the piston-rod, said nut bearing directly on the boss or disk. The ordinary leather bushing, $d$, crimped to form a flange, 1, at right angles to the cylindrical part 2, rests against the lower face of the disk, said leather being adapted in the cylindrical part to fit accurately into the cylinder of the pump.

It is well known to those skilled in the art to which my invention appertains that the cylindrical leather bushing or packing should be expanded to cause it to bear upon the walls of the cylinder, principally at the open or lower end. To accomplish this I place within the cylindrical part of the leather a thick rubber disk, (marked $e$,) bearing, when in place, directly against the inwardly-turned flange of the leather bushing, and clamp it to the iron disk $b$. On the lower face of this rubber disk I screw down a nut, $f$, on the end of the rod projecting through said disk, forcing the nut into the disk of rubber, so as to cause the lower face to expand and press against the leather, forcing it upward.

The expansion described will manifestly be proportioned to the amount of pressure exerted by the nut upon the rubber. I make the nut $f$ in the form of a truncated cone, so as the more readily to expand the rubber.

I have described the thick expanding disk as made of india-rubber; but any other expansible material not affected by the water may be used. I have found the rubber best. As the parts wear and the piston thereby begins to work loosely, it is only necessary to turn up the nut $f$, or turn down the upper nut, so as to force the lower nut into the rubber to expand the same and press out the leather flange. This flange may also be made of rubber or some other material suited to the purpose.

In pumps of this class it is inconvenient to take out the piston from the cylinder when it needs readjustment. I have therefore devised simple means for effecting this adjustment while the piston remains in the cylinder. This I accomplish by forming on the upper end of the cylinder in which the piston works a socket in line with the piston-rod, this socket being polygonal or otherwise shaped to fit the upper nut when the piston is drawn up. In order, therefore, to tighten the nuts and increase the pressure upon the rubber or other expansible disk, it is only necessary to draw up the piston till the upper nut enters the cavity or recess or socket, when it is held while the piston-rod is turned. As the piston-rod is turned it passes through the upper nut, all below said upper nut turning with the rod. This forces down the upper nut and presses the lower into the rubber disk, thereby expanding the rubber and the bushing or packing without removing the piston from the cylinder. The socket is shown at $f'$. It is attached to the end of the cylinder by arms 2 3, fixed by screws or otherwise to said end. It will be apparent that all the desired movement can be obtained by turning the upper nut. The lower nut need not therefore be threaded, but may be formed upon or held upon the lower end in any suitable way. All that is required of this nut is that it shall have proper form and size to press into the expansible disk and force it outward.

I am aware that a cup-shaped packing containing a disk of rubber, the whole held between two metallic disks, is not new. This is shown in the patent of Fuller, granted January 24, 1865, the distinction between which and my invention is that in mine a nut is substituted for the plate, whereby the rubber is forced outward in order to throw out the flange of the cup-shaped packing, and to cause its edge to bear against the sides of the cylinder, as explained.

I am aware that an expansible disk has been used to press out the cup-shaped leather packing, such disk being compressed between two plates. The distinction between this part of my invention and the references lies in the conical nut, by which an increased expansion can be obtained with less force applied to the nut, and, further, in dispensing with the use of one plate.

I am aware also that stops have been provided, as in the patent of Edson, No. 13,254, of 1855, said stops serving in connection with ratchet-nuts to hold the piston while the rod is turned to bring the parts together. My improvement upon this consists in the adaptation of a socket to the ordinary nut, whereby the parts are simplified in construction and operation.

Having thus described my invention, what I claim as new, and desire to secure by Letters Patent, is—

1. In combination with the piston-rod, a disk, $b$, a cup-shaped packing having its edge free to move outward, an expansible disk within said packing, and a conical nut bearing centrally on said expansible disk, and adapted to be forced into and to expand the same, whereby the said free edge of the packing may be pressed outwardly, substantially as set forth.

2. The combination of the cylinder, the piston-rod and piston, the packing, and the expansible disk within the packing, and the socket fixed to the upper end of the cylinder, adapted to receive the upper nut, and to turn it down to compress said packing, as set forth.

In testimony whereof I have signed my name to this specification in the presence of two subscribing witnesses.

PHILIP A. MYERS.

Witnesses:
F. L. MIDDLETON,
DAVID H. MEAD.